United States Patent Office 3,529,062
Patented Sept. 15, 1970

3,529,062
INDOLE DERIVATIVES AS ANTITUSSIVE AGENTS
Ulrich Renner, Riehen, Switzerland, assignor to Geigy Chemical Corporation, Greenburgh, N.Y., a corporation of Delaware
No Drawing. Original application Dec. 1, 1965, Ser. No. 510,946, now Patent No. 3,419,569, dated Dec. 31, 1968. Divided and this application Sept. 6, 1968, Ser. No. 803,493
Claims priority, application Switzerland, Dec. 3, 1964, 15,658/64, 15,659/64
Int. Cl. A61k 27/00
U.S. Cl. 424—274
17 Claims

ABSTRACT OF THE DISCLOSURE 3-loweralkyl or (3-benzyl)-2,3,4,5-tetrahydro-1H-azepino-[4,5-b] indoles and derivatives thereof are prepared by reacting a hexahydro-4H-azepino-4-one with a di-aryl lower-alkyl hydrazine in an ice cooled alcoholic medium saturated with hydrogen chloride, removing the ammonium chloride as it forms, refluxing until the reaction is complete (approx. 2 hours) and recovering the desired 2,3,4,5-tetrahydro-1H-azepino[4,5-b]indole by conventional means. These compounds have strong antitussive activity and are indicated for inhibiting cough.

CROSS-REFERENCE TO RELATED CASE

This is a divisional of my application Ser. No. 510,946, filed Dec. 1, 1965, now U.S. Pat. No. 3,410,560.

This invention relates to new indole derivatives and processes for the production of these compounds which are valuable pharmaceuticals.

More in particular, the present invention provides new therapeutically valuable indole derivatives of the formula

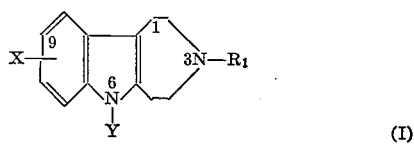

(I)

wherein:

X represents hydrogen, a halogen atom up to the atomic number 35 inclusive or a lower alkyl or lower alkoxy radical, and
Y represents hydrogen or a group of the formula

Z represents a phenyl radical which is unsubstituted or can be substituted by one or several substituents falling under the definition of X, namely halogen of an atomic number up to 35 inclusive, lower alkyl or lower alkoxy, or it represents a pyridyl radical.
$R_1$ represents hydrogen, a lower alkyl radical or the benzyl radical, and
$R_2$ represents hydrogen or a lower alkyl radical and their addition salts with inorganic and organic acids.

In the compounds of Formula I, X is, for example, hydrogen, the methyl, ethyl, n-propyl, isopropyl, n-butyl, isobutyl or tert. butyl radical, the methoxy, ethoxy, n-propoxy, isopropoxy or n-butoxy radical, fluorine, chlorine or bromine;
Z is, for example, the phenyl, fluorophenyl, chlorophenyl, bromophenyl, methylphenyl, ethylphenyl, isopropylphenyl, a dimethylphenyl, a methoxyphenyl, ethoxyphenyl, n-propoxyphenyl, isopropoxyphenyl or a dimethoxyphenyl moiety, or also the 2-pyridyl, 3-pyridyl or 4-pyridyl radical;

$R_1$ is, for example, hydrogen, the methyl, ethyl, n-propyl or the benzyl radical and
$R_2$ is preferably hydrogen or the methyl group.
Compounds falling under Formula I and which correspond to the Formula Ia

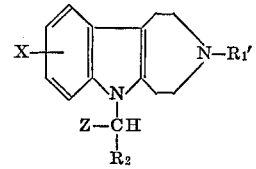

(Ia)

wherein X, Z and $R_2$ have the above given meaning and $R_1'$ represents a lower alkyl group, especially the methyl or ethyl group, and their pharmaceuticaly acceptable salts with acid have, besides a strong histamine antagonistic activity, surprisingly valuable antitussive properties. Compounds of Formula Ia and their non-toxic salts can, therefore, be used for the treatment of cough.

Compounds of the formula

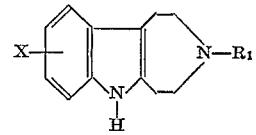

(Ib)

wherein $R_1$ and X have the meanings given hereinbefore, apart from being useful as intermediates in the production of compounds of Formula Ia, also possess serotoninantagonistic and central-nervous-system-stimulating properties, which indicates their usefulness as stimulants.

The antitussive properties of the following Compounds I–III according to this invention have been compared with those of a compound IV which compound is known from British Pat. No. 721,171.

(I) ——— 6-benzyl - 3 - methyl - 2,3,4,5 - tetrahydro-1H-azepino[4,5-b]indole;
(II) ——— 6 - benzyl-9-chloro-3-ethyl - 2,3,4,5 - tetrahydro-1H-azepino[4,5-b]indole;
(III) ——— 6-benzyl-10-chloro - 3 - methyl - 2,3,4,5-tetrahydro-1H-azepino[4,5-b]indole;
(IV) ——— 5-benzyl-methyl - 2,3,4,5 - tetrahydro-1H-pyrido[3,4-b]indole.

According to standard tests, the antitussive properties, (viz R. Domenjoz "Arch. exp. pharmacol. pathol.," 215, pages 19–24 [1952]), were determined. The tested compounds were administered in the form of aqueous solutions of their hydrochlorides. The test results are compiled in the table below. The last column gives the acute toxicity ($DL_{50}$) in mg./kg., which has been determined by intravenous injection in mice.

The values given in column II show the amount of test substance in mg. per kilogram bodyweight which, injected intravenously, inhibits coughing in the tested animals.

TABLE

| Test compound | Minimum amount inhibiting cough (mg./kg.) | Toxicity $DL_{50}$ i.v. (mouse) |
|---|---|---|
| I | 1 | 49 |
| II | about 1.5 | 48 |
| III | 1 | 48 |
| IV | 5 | 42 |

These tests demonstrate that Compounds I to III possess useful antitussive properties, their therapeutical index being in the order of 30–50, while Compound IV shows no useful cough-inhibiting activity, its therapeutical index being only about 8. The data in fact demonstrate a divergence between the properties of the compounds according to the invention, on the one hand, and Compound IV, on the other hand.

The above described compounds according to the invention are produced by processes described more in detail hereinafter:

One of the syntheses most generally used for the production of indole is undoubtedly that according to E. Fischer, which starts from optionally substituted phenyl hydrazine and the most various aldehydes and ketones and proceeds by way of the corresponding phenyl hydrazones. The disadvantage of this method, however, is that it leads to mixtures of isomers if phenyl hydrazones are used as starting materials which are derived from asymmetrically formed ketones, particularly if the degree of structural asymmetry is slight. Compare, for example, B. Robinson, Chem. Reviews 63, 373–402, particularly 387–388 (1963). In view of the literature cited in that article, it was to be expected that on cyclising the phenyl hydrazones of N-substituted hexahydro-4H-azepine-4-ones, mixtures of isomers would be formed.

In contrast thereto, it has now surprisingly been found that the indole derivatives of the general Formula I given above are obtained in good yields as uniform reaction products by treating a phenyl hydrazone of the general Formula II

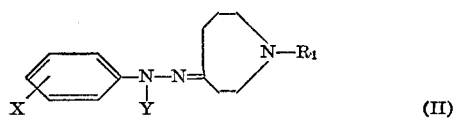

(II)

wherein X, Y and $R_1$ have the meanings given above and X is preferably in the m- or p-position, with an acid condensing agent. If thereby a reaction product of the general Formula I is obtained, wherein Y is represented by hydrogen and $R_1$ by a lower alkyl group, which corresponds to the general Formula III

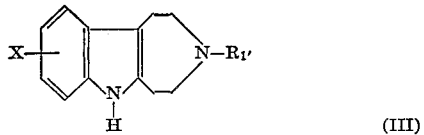

(III)

wherein X has the above given meaning and $R_1'$ represents a lower alkyl group, then this reaction product is subsequently reacted in the presence of an alkaline condensing agent with a reactive ester of a compound of the general Formula IV

(IV)

wherein Z and $R_2$ have the above given meaning.

Compounds of the general Formula III can be obtained from compounds of the general Formula I, wherein Y represents hydrogen and $R_1$ is benzyl, by debenzylating in the known manner e.g. with activated hydrogen such 3-benzyl-2,3,4,5-tetrahydro-1H-azepino[4,5-b]indoles and by treating the so obtained 2,3,4,5-tetrahydro-1H-azepino [4,5-b]indoles with a reactive ester of a lower alkanol in the presence of an acid binding agent or by treating them under reducing conditions with a lower alkanal.

The acids according to Lewis' definition such as are usual in indole synthesis according to E. Fischer are suitable condensing agents for the first reaction step which, depending on the meaning of Y and $R_1$, can also be the whole reaction. Examples are hydrogen chloride in ethanol, dilute aqueous sulphuric acid, polyphosphoric acid, formic acid or zinc chloride or boron fluoride etherate in glacial acetic acid. The ring is closed at room temperature to boiling temperature depending on the type of condensing agent and the medium.

The phenylhydrazone of Formula II necessary as starting material, is formed advantageously from the corresponding phenyl hydrazine of the general Formula V

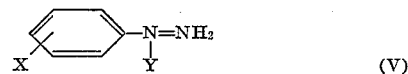

(V)

and a hexahydro-4H-azepine-4-one of general Formula VI

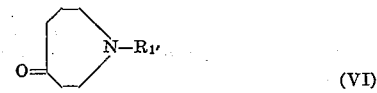

(VI)

in which formulae X, Y and $R_1'$ have the meanings given above, or from their salts. It is formed in situ immediately before the ring is closed either by heating the components in the chosen reaction medium before the addition of the condensing agent, or it is formed in the presence of the condensing agent. In the latter case, ring closure occurs immediately on heating. The use of a previously formed phenyl hydrazone of the general Formula II is of interest, for example, if the formation of this hydrazone can serve as a means for the separation of the phenyl hydrazine or the hexahydro-4H-azepine-4-one from a mixture formed in the production thereof. Compounds of the general Formulae V and VI are known and others can be produced in an analogous way.

According to another process, compounds of the general Formula I can be produced, by condensing a substituted hydrazine of the general Formula VII

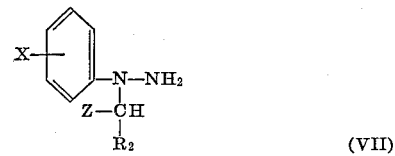

(VII)

wherein X, Z and $R_2$ have the above given meaning, in an aqueous acid medium with a ketal of a hexahydro-4H-azepine-4-one of the general Formula VIII

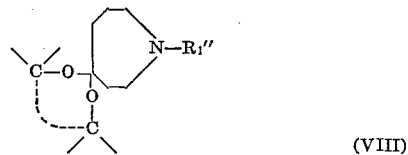

(VIII)

wherein $R_1''$ has the meaning of hydrogen or a lower alkyl radical. This process is particularly advantageous, when the azepinone of the general Formula VIII is not stable e.g. when $R_1''$ is H. As ketal groups are chosen preferably geminal di(lower)alkoxy groups, such as the geminal dimethoxy or geminal diethoxy groups or cyclic groups, such as ethylene or methylene dioxy groups.

To introduce a rest of the general formula

into a reaction product of the general Formula III this product is converted, e.g., with the aid of an alkaline condensing agent, into its alkali metal compound and the latter is reacted, for example, with a benzyl halide or p-toluene sulphonic acid benzyl ester which can optionally be substituted corresponding to the definition of Z and $R_2$. Sodium hydride, also sodium in liquid ammonia or the sodium compound of naphthalene formed in situ from naphthalene and sodium in tetrahydrofuran, for example, can be used as alkaline condensing agents.

Compounds which fall also under the class defined by general Formula I, and are of the formula

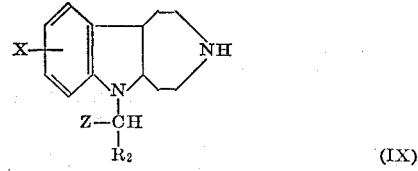

(IX)

wherein X, Z and $R_2$ have the meaning given above, can be alkylated by reacting them with a reactive ester of a lower alkanol in the presence of an acid binding agent or by treating them under reducing conditions with a lower alkanal.

Examples of reactive esters of lower alkanols are the halides, sulphuric acid esters and aryl sulphonic acid esters, particularly p-toluene sulphonic acid esters which, for example, are used in the presence of potassium carbonate as acid binding agent and, preferably, with the addition of potassium iodide in inert organic solvents such as acetone or butanone.

Particularly suitable as lower alkanal is formaldehyde, but also acetaldehyde and propionaldehyde, which are reacted in the presence of complex metal hydrides such as lithium-aluminum hydride or sodium borohydride, in an organic solvent, in lower alkanols or ethers, such as diethyl ether, tetrahydrofuran or diglyme.

The new indole derivatives can be administered orally, rectally and parenterally. The daily dosages of the free bases or non-toxic salts thereof vary between 2 and 100 mg., preferably 5–50 mg., for adult patients. Suitable dosage units such as dragées (sugar coated tablets), tablets, suppositories, syrups or ampoules, preferably contain 2–25 mg. of an indole derivative produced according to the invention or a non-toxic salt thereof.

By non-toxic salts of the bases usable according to the invention are meant those salts, derived from acids the anions of which are pharmaceutically acceptable in the usual dosages, i.e. those which cause no toxic effects. It is also of advantage if the salts to be used crystallise well and are not or are only slightly hygroscopic. Examples of non-toxic salts are the salts with hydrochloric acid, hydrobromic acid, sulphuric acid, phosphoric acid, methane sulfonic acid, ethane sulphonic acid, β-hydroxyethane sulphonic acid, acetic acid, lactic acid, oxalic acid, succinic acid, fumaric acid, maleic acid, malic acid, tartaric acid, citric acid, benzoic acid, salicylic acid, phenyl acetic acid, mandelic acid, pamoic acid and naphthalene-1,5-disulphonic acid and also salts with other substances such as 8-chlorotheophylline.

Dosage units for oral administration preferably contain between 1% and 90% of a compound of the general Formula Ia or a non-toxic salt thereof as active substance. They are produced by combining the active substance with, e.g. solid, pulverulent carriers such as lactose, saccharose, sorbitol, mannital; starches such as potato starch, maize starch or amylopectin, also laminaria powder or citrus pulp powder; cellulose derivatives or gelatines, optionally with the addition of lubricants such as magnesium or calcium stearate or polyethylene glycols (Carbowaxes) of suitable molecular weights, to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Examples of dosage units for rectal administration are suppositories consisting of a combination of an active substance or a suitable salt thereof with a neutral fatty foundation, or also gelatine rectal capsules which contain a combination of the active substance or a suitable salt thereof with polyethylene glycols (Carbowaxes) of suitable molecular weight.

Ampoules for parenteral, particularly intramuscular, administration preferably contain a water soluble salt of an active substance in a concentration of preferably 0.5–5%, in aqueous solution, optionally together with suitable stabilising agents and buffer substances.

The following prescriptions further illustrate the production of tablets and dragées:

(a) 250 g. of 3-ethyl-6-benzyl-9-chloro-2,3,4,5-tetrahydro-1H-azepino[4,5-b]indole are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicium dioxide are mixed in and the mixture is pressed into 10,000 tablets each weighing 100 mg. and containing 25 mg. of active substance. If desired, the tablets can be grooved for better adaptation of the dosage.

(b) A granulate is prepared from 250 g. of 3-ethyl-6-benzyl - 9-chloro-2,3,4,5-tetrahydro-1H-azepinol[4,5-b]indole, 175.90 g. of lactose and the alcoholic solution of 10 g. of stearic acid. After drying, it is mixed with 56.60 g. of colloidal silicium dioxide, 165 g. of talcum, 20 g. of potato starch and 2.50 g. of magnesium stearate and the mixture is pressed into 10,000 dragée cores. These are then coated with a concentrated syrup of 522.28 g. of crystallized saccharose, 6 g. of Shellack, 10 g. of gum arabic, 215 g. of talcum, 15 g. of colloidal silicium dioxide, 0.22 g. of dyestuff of 1.5 g. of titanium dioxide and dried. The dragées obtained each weigh 145 mg. and contain 25 mg. of active substance.

Syrups or suspensions for peroral application consist, for example, of a solution containing at least about 2% and at most about 20% by weight of active substance, sugar and a mixture of ethanol, water and glycerine as well as propyleneglycol and, e.g., aroma, saccharine and/or carboxymethylcellulose (for suspension purpose).

The following non-limitative examples further illustrate the production of the new compounds of Formula I. The temperatures are given in degrees centigrade. Percentages are given therein by weight.

Example 1

(a) 14.85 g. of 1-methyl-hexahydro-4H-azepin-4-one are dissolved in 150 ml. of abs. ethanol which has previously been saturated with hydrogen chloride at ice-bath temperature. 12.62 g. of phenyl hydrazine are then added to the solution whereupon the temperature rises to 40–50° and the ammonium chloride formed in the reaction is precipitated. The reaction mixture is refluxed for another 2 hours, cooled, the precipitate is filtered off and the filtrate is concentrated to dryness in vacuo. The residue is taken up in 100 ml. of water, the aqueous solution is made alkaline with 20% potassium hydroxide solution and extracted successively with four 150 ml. portions of ether. The ether extracts are combined, dried over sodium sulphate and concentrated to a small volume. The crude 3-methyl - 2,3,4,5-tetrahydro-1H-azepino[4,5-b]indole crystallises out. After recrystallising once from ether it is obtained in colourless crystals which melt at 163–165°.

Carrying out the procedure described above, but substituting for phenylhydrazine a substituted phenylhydrazine in equimolar amount, there is produced:

(b) With m-chlorophenylhydrazine: a separable mixture of 8-chloro-3-methyl-2,3,4,5-tetrahydro-1H-azepino-[4,5-b]indole and 10-chloro-3-methyl-2,3,4,5-tetrahydro-1H-azepino[4,5-b]indole, separation of which is effected according to the method described in Example 6;

(c) With m-tolylhydrazine: a separable mixture of 3,8-dimethyl-2,3,4,5-tetrahydro-1H-azepino[4,5-b]indole and 3,10 - dimethyl - 2,3,4,5-tetrahydro-1H-azepino[4,5-b]-indole, the separation of the compounds being effected according to the method described in Example 5;

(d) With p-chlorophenylhydrazine: 9 - chloro - 3 - methyl - 2,3,4,5-tetrahydro-1H-azepino[4,5-b]indole;

(e) With p-tolylhydrazine: 3,9-dimethyl - 2,3,4,5-tetrahydro-1H-azepino[4,5-b]indole.

Example 2

A mixture of 36 g. of 1-ethyl-hexahydro-4H-azepin-4-one and 28 g. of phenylhydrazine are heated in a boiling water bath for 5 minutes and then a solution of 65 ml. of concentrated sulphuric acid in 1000 ml. of water is added. The solution is heated for 1 hour at 100–110°, cooled, made alkaline with concentrated potassium hydroxide solution while cooling with ice and extracted successively with three 300 ml. portions of ether. The combined ether extracts are dried over sodium sulphate and concentrated to a small volume whereupon 3-ethyl-2,3,4,5-tetrahydro-1H-azepino[4,5-b]indole crystallises, M.P. 106–108°. On chromatographing the mother liquors on alumina (activity I according to Brockmann), a further amount of reaction product is eluted with benzene.

Example 3

A mixture of 5.65 g. of 1-ethyl - hexahydro - 4H-azepin - 4 - one and 4.3 g. of phenylhydrazine is heated for 5 minutes on a boiling water bath, then dissolved in 20 ml. of glacial acetic acid and, after the addition of 4.2 g. of boron trifluoride ethyl etherate, the whole is slowly heated. The reaction begins at about 100° bath temperature with boiling of the solution. The initial reaction is completed by heating for half an hour at 140°. After cooling, the precipitated ammonia-borofluoride complex is filtered off under suction, the filtrate is diluted with 100 ml. of water, made alkaline with concentrated ammonia while cooling with ice and extracted successively with three 50 ml. portions of ether. The ether extracts are combined, dried over sodium sulphate and concentrated to a small volume. 3-ethyl-2,3,4,5-tetrahydro - 1H-azepino[4,5-b]indole crystallises, M.P. 106–108°, compare Example 2.

Instead of boron trifluoride etherate/glacial acetic acid also polyphosphoric acid can be used in an analogous way as condensing agent and reaction medium for the indole ring closure from the phenyl hydrazone formed as intermediate product. In this case, the reaction is strongly exothermic and requires no external heating. Prevention of over-heating can be ensured by cooling with ice.

Example 4

A mixture of 14.1 g. of 1-ethyl-hexahydro-4H-azepin-4-one and 14.0 g. of m-methoxy-phenyl hydrazine is heated for 5 minutes on a boiling water bath and then poured into a solution of 25 ml. of concentrated sulphuric acid in 400 ml. of water. The solution is refluxed for 1 hour, cooled to 0°, made alkaline with concentrated potassium hydroxide solution and extracted with ether. The ether extract is dried over potassium carbonate and then concentrated to a small volume. The 3-ethyl-8-methoxy-2,3,4,5-tetrahydro-1H - azepino[4,5-b]indole crystallises, M.P. 142°.

Example 5

A mixture of 14 g. of 1-ethyl-hexahydro-4H-azepin-4-one and 12.2 g. of m-tolyl hydrazine is heated for 5 minutes on a boiling water bath and then poured into a solution of 25 ml. of concentrated sulphuric acid in 400 ml. of water. The acid solution is refluxed for 90 minutes, cooled to 0°, made alkaline with concentrated potassium hydroxide solution and extracted with ether. The ether extract is dried with potassium carbonate and concentrated. 20.2 g. of an oily reaction product remain which are dissolved in 100 ml. of hot ethanol. 100 ml. of an ethanolic picric acid solution which has been saturated at 30°, is added to the solution, the picrates which precipitate are filtered off under suction, recrystallised from methanol/acetone and the crystals are dissolved in a mixture of acetone/methanol 2:1. The picrate solution is filtered on a column prepared with 250 g. of a strongly basic anion exchanger (Amberlite IRA 400) in its chloride form, the column is washed with methanol and the eluates are evaporated to dryness. The residue is dissolved in 250 ml. of water, the solution is made alkaline with concentrated potassium hydroxide solution and extracted with ether. The ether extract, dried over potassium carbonate, is concentrated to a small volume whereupon 3-ethyl-10-methyl - 2,3,4,5-tetrahydro - 1H - azepino[4,5-b]indole crystallises, M.P. 122–123°. The mother liquors are concentrated and petroleum ether is added whereupon 3-ethyl-8-methyl-2,3,4,5 - tetrahydro - 1H-azepino[4,5-b]indole crystallises. M.P. 83–85°.

Example 6

21.1 g. of 1-ethyl-hexahydro-4H-azepin-4-one are dissolved in 400 ml. of cold, saturated ethanolic hydrochloric acid, 21.5 g. of m-chlorophenyl hydrazine are added and the solution is refluxed for 2 hours. After cooling, precipitated ammonium chloride is filtered off, the filtrate is evaporated to dryness in vacuo and the residue is dissolved in 150 ml. of water. The aqueous solution is made alkaline with 20% potassium hydroxide solution and extracted with ether. After drying over potassium carbonate, the ether extract is evaporated to dryness, the residue (41.5 g. oil) is dissolved in 200 ml. of a mixture of benzene/petroleum ether 1:1 and filtered on a column prepared with 1.6 kg. of alumina (activity III according to Brockmann). Initially 3 g. of non-crystallising impurities are eluted with a mixture of benzene/petroleum ether 1:1. Then with benzene 16 g. of a product are eluted from which, on triturating with ether, crystalline 8-chloro-3-ethyl-2,3,4,5-tetrahydro-1H-azepino[4,5 - b]indole separates. It has the double melting point 120° and 134–135°. Further substance is eluted with a mixture of benzene/ether (9:1 or 7:1) from which the isomeric 10-chloro - 3 - ethyl - 2,3,4,5 - tetrahydro - 1H - azepino[4,5-b]indole crystallises in prisms from ether, M.P. 144–144.5°.

Example 7

(a) 14.1 g. of 1-ethyl-hexahydro-4H-azepin-4-one are dissolved in 250 ml. of cold, saturated ethanolic hydrochloric acid, 15.9 g. of p-tolyl hydrazine are added and the solution is refluxed for 2 hours. After cooling, precipitated ammonium chloride is filtered off under suction, the filtrate is evaporated to dryness in vacuo, the residue is dissolved in 100 ml. of water, the solution is made alkaline with concentrated potassium hydroxide solution and extracted with ether. After drying over potassium carbonate, the ether extract is evaporated to dryness, the residue is dissolved in 100 ml. of hot methanol and a saturated methanolic picric acid solution is added to the solution until precipitation is complete. The picrate is filtered off under suction and recrystallised once from acetone/methanol (M.P. 178–179°). To obtain the free base, the picrate is converted as described in Example 5 on a strongly basic anion exchanger (Amberlite IRA 400, Cl⁻ form) into the hydrochloride and the free base is obtained from the latter. In this way, 3-ethyl-9-methyl-2,3,4,5 - tetrahydro - 1H - azepino[4,5 - b]indole is obtained which crystallises into needles from ether, M.P. 116–117°.

In an analogous manner the following two compounds are obtained:

(b) With p-chlorophenyl hydrazine, 9-chloro-3-ethyl-2,3,4,5 - tetrahydro - 1H - azepino[4,5 - b]indole, M.P. 116–117°; and (c) With p-methoxyphenyl hydrazine, 3-ethyl-9-methoxy - 2,3,4,5 - tetrahydro - 1H - azepino[4,5-b]indole, M.P. 137–138°.

Example 8

(a) 1500 ml. of abs. ethanol are saturated with hydrogen chloride while cooling with ice and first 92 g. of 1-benzyl-hexahydro-4H-azepin-4-one and then a solution of 50 g. of phenyl-hydrazine in 250 ml. of abs. ethanol are added to the solution. To ensure completion of the reaction, the solution is refluxed for another 2 hours. After cooling, precipitated ammonium chloride is filtered off and the filtrate is evaporated to dryness in vacuo. The residue is dissolved in 250 ml. of water, the solution is made alkaline with 20% potassium hydroxide solution and extracted with three 150 ml. portions of ether. The combined ether extracts are dried over sodium sulphate, the ether is evaporated off and the residue is crystallised from methanol. 3-benzyl-2,3,4,5-tetrahydro-1H-azepino[4,5-b]indole is obtained, M.P. 117–119°. On chromatographing the residues of the mother liquors on alumina (Activity I according to Brockmann) further amounts of this product are recovered from the benzene eluates.

(b) 33.6 g. of 3-benzyl-2,3,4,5-tetrahydro-1H-azepino[4,5-b]indole in 300 ml. of methanol and 8 g. of palladium charcoal (5%) shaken a troom temperature in an atmosphere of hydrogen until no more hydrogen is taken up (about 21 hours). After filtering off the catalyst, the solution is evaporated to dryness in vacuo and the residue is crystallised from ether whereupon 2,3,4,5-tetrahydro-1H-azepino[4,5-b]indole is obtained as colourless crystals which melt at 189–192°.

Example 9

(a) 2.00 g. of 3-methyl-2,3,4,5-tetrahydro-1H-azepino[4,5-b]indole are dissolved in 25 ml. of abs. benzene and to the stirred solution 1.08 g. of chloroformic acid ethyl ester in 10 ml. of abs. benzene is added whereupon the temperature rises to about 35° and the solution becomes cloudy. It is then refluxed for another half hour. After cooling, 100 ml. of ether are added to the solution and it is washed three times with 25 ml. each of 1 N hydrochloric acid, water and saturated sodium bicarbonate solution. The organic phase is dried over sodium sulphate and evaporated to dryness. The residue is chromatographed on a column of 60 g. of alumina (Activity III according to Brockmann). First eluates of non-crystallising impurities are obtained with benzene. The desired 3-ethoxycarbonyl-2,3,4,5-tetrahydro-1H-azepino[4,5-b]indole is eluted with a mixture of benzene/ether. It crystallises from ether in small felted needles, M.P. 168–170°.

(b) 2.58 g. of 3-ethoxycarbonyl-2,3,4,5-tetrahydro-1H-azepino[4,5-b]indole in a solution of 2 g. of potassium hydroxide in 16 ml. of diethylene glycol monomethyl ether are heated for 6 hours at 170°. After cooling, the solution is diluted with 100 ml. of water and extracted with chloroform. The chloroform extract is dried and evaporated to dryness. On taking up the residue in ether, 2,3,4,5-tetrahydro-azepino[4,5-b]indole crystallises, M.P. 188–191°.

Following steps (a) and (b) above, 3-benzyl-2,3,4,5-tetrahydro-1H-azepino[4,5-b]indole is analogously converted to 2,3,4,5-tetrahydro-azepino[4,5-b]indole.

Example 10

18.6 g. of 2,3,4,5-tetrahydro-1H-azepino[4,5-b]indole are dissolved in 500 ml. of dried ethanol, 27 g. of powdered potassium carbonate and 15.4 g. of diethyl sulphate are then added thereto and the mixture is stirred and boiled under reflux for 24 hours. Then the undissolved salts are filtered off, the filtrate is concentrated to dryness in vacuo and the residue is taken up in 300 ml. of ether. The ethereal phase is washed with 100 ml. of water, dried over sodium sulphate and concentrated to dryness. The residue is dissolved in 50 ml. of benzene and adsorbed on a column filled with alumina (Activity II according to Brockmann). It is then eluted with 5000 ml. of benzene whereby fractions of 1000 ml. are collected. After evaporating the solvent, 14.3 g. of residue are obtained which crystallises when heated with ether. 11.7 g. of 3-ethyl-2,3,4,5-tetrahydro-1H-azepino[4,5-b]indole, M.P. 102–104°, are thus obtained.

On using dimethyl sulphate instead of diethyl sulphate in this process, 3-methyl-2,3,4,5-tetrahydro-1H-azepino[4,5-b]indole is obtained.

Example 11

117.4 g. of N¹-benzyl-phenyl hydrazine hydrochloride are dissolved in 1000 ml. of abs. ethanol, 63.5 g. of 1-methyl-hexahydro-4H-azepin-4-one are added, the solution is cooled to 0° and a dry stream of hydrogen chloride is added quickly until saturation is reached. The solution is then refluxed for 3 hours. After cooling, precipitated ammonium chloride is filtered off under suction, the filtrate is evaporated to dryness in vacuo, the residue is dissolved in 750 ml. of water, the solution is made alkaline with 20% potassium hydroxide solution and the bases liberated are extracted with ether. The ether extract, after drying over potassium carbonate, is evaporated to dryness and the residue is fractionated at 0.2 torr. After separating a fore-run of 13 g. of material boiling below 150°, the main product is collected, B.P. 168–172°. The viscous product is disolved in 500 ml. of acetone and ethereal hydrochloric acid is added until precipitation is complete. The precipitate is collected and consists of 6-benzyl-3-methyl-2,3,4,5-tetrahydro-1H-azepino[4,5-b]indole hydrochloride, M.P. 201–202° (with decomposition).

The table below lists further derivatives of 2,3,4,5-tetrahydro-1H-azepino[4,5-b]indole by giving in the first column substituents in the 3- and 6-positions, and optionally also in the aromatic ring, as specified, which derivatives are prepared according to the process described above. In the second column of the table, the melting points of the hydrochloride addition salts of these derivatives are given.

| Substituents: | Hydrochloric M.P., ° |
|---|---|
| 6-benzyl-3-ethyl-8-methoxy- | 215–217 |
| 6-benzyl-3-ethyl-8-methyl- | 201–203 |
| 6-benzyl-3-ethyl-10-methyl- | 232–235 |
| 6-benzyl-3-ethyl-8-chloro- | 220–222 |
| 6-benzyl-10-chloro-3-ethyl- | 248–251 |
| 6-benzyl-3-ethyl-9-methyl- | 224–225 |
| 6-benzyl-9-chloro-3-ethyl- | 240–242 |
| 6-benzyl-9-chloro-3-methyl- | 248–249 |
| 6-benzyl-8-chloro-3-methyl- | 122–124 |
| 6-benzyl-10-chloro-3-methyl- | 223–225 |
| 6-(o-chlorobenzyl)-3-methyl- | 228–229 |
| 6-(m-methoxybenzyl)-3-methyl- | 191–193 |
| 6-(p-chlorobenzyl)-3-ethyl- | 215–216 |

Example 12

A mixture of 36 g. of 1-ethyl-hexahydro-4H-azepin-4-one and 28 g. of phenylhydrazine is heated for 5 minutes on a boiling water bath and then added to a solution of 65 ml. of concentrated sulphuric acid in 1000 ml. of water. The solution is heated for 1 hour at 100–110°, cooled and then made alkaline with concentrated potassium hydroxide solution while cooling with ice, and extracted with three 300 ml. portions of ether. The combined ether extracts are dried over sodium sulphate and concentrated to a small volume whereupon the 3-ethyl-2,3,4,5-tetrahydro-1H-azepino[4,5-b]indole crystallises, M.P. 106–108°. Further reaction product is obtained by chromatography of the mother liquors on alumina (Activity I according to Brockmann) using benzene as eluent.

In an atmosphere of nitrogen 2.5 g. of naphthalene are dissolved in 40 ml. of abs. tetrahydrofuran, and 0.39 g. of sodium chips are added to the stirred solution. Stirring is continued for 1 hour at 50° after which time all the sodium has dissolved. 3.21 g .of 3-ethyl-2,3,4,5-tetrahydro-1H-azepino[4,5-b]indole in 40 ml. of abs. anisol are then added and the tetrahydrofuran is distilled off. After temperature has risen to 140° the remaining mixture is refluxed for another hour and then 1.3 g. of benzyl chloride in 10 ml. of abs. anisol are added dropwise. The reaction mixture is refluxed for a further 4 hours at 180°, cooled, diluted with 100 ml. of ether and washed with water. The ether phase is extracted with three 50 ml. portions of 2 N sulphuric acid, the aqueous acid solution is made alkaline with concentrated ammonia solution and the bases are extracted into ether. After drying the ether extract over sodium sulphate and evaporating to dryness, 3.9 g. of an oily product are obtained. This is purified by a 26 step countercurrent distribution between benzene and ether (1:1) and citric phosphate buffer of pH 4.0. The steps 8–18 of the distribution contain 6-benzyl-3-ethyl-2,3,4,5-tetrahydro-1H-azepino[4,5-b]indole which can be characterised by a crystallised picrate which melts at 199–202°.

Example 13

0.39 g. of sodium chips are added at −70° to 100 ml. of liquid ammonia and the whole is stirred for half an hour until complete solution is attained. 3.21 g. of 3-ethyl-2,3,4,5-tetrahydro-1H-azepino[4,5-b]indole are then added, stirring is continued for another half hour and finally 1.3 g. of benzyl chloride in 40 ml. of ether are added dropwise. The ammonia is allowed to evaporate off, the residue is taken up in 100 ml. of ether, washed with water, dried over sodium sulphate and the other is evaporated off. The oily residue (3.9 g.) is purified by countercurrent distribution as described in Example 12(b). 6-benzyl-3-ethyl-2,3,4,5-tetrahydro-1H-azepino[4,5-b]indole is obtained. On dissolving it in acetone and adding ethereal hydrochloric acid, the hydrochloride crystallises out in colourless needles which melt at 223–228° (with decomposition).

Example 14

18.9 g. of 1-phenyl-1-(1-phenylethyl)-hydrazine hydrochloride and 9.7 g. of 1-methyl-hexahydro-4H-azepin-4-one are dissolved with stirring in 75 ml. of glacial acetic acid and to the solution is added 21.8 g. of boron trifluoride etherate. An exothermic reaction starts immediately and causes the inner temperature to rise to 55–60°. After the reaction slows down the temperature is raised for 1 hour to 80–90°. The reaction is then allowed to cool and the boron trifluoride-ammonia complex is separated by filtration from the reaction mixture; the filtrate is diluted with 250 ml. of water and rendered alkaline with 4 N sodium hydroxide solution and extracted with ether. The ether extract is dried over sodium sulphate and concentrated to 200 ml. The concentrated ether extract is then extracted in a 10-stage countercurrent distribution according to Craig between citric acid/phosphate buffer (pH 3.8) and benzene-ether.

The residue (11 g.) from the first to sixth stage of the 10-stage treatment is dissolved in 100 ml. of acetone, and a cold saturated solution of hydrochloric acid in ether is added thereto. Upon trituration, 9.7 g. of 3-methyl-6-(1-phenylethyl)-2,3,4,5-tetrahydro-(1H) - azepino[4,5-b]indole hydrochloride, M.P. 207–208° crystallise and are then recrystallised from methanol-ether.

The base can also be characterised as a picrate salt, M.P. 231–232°.

Example 15

10.6 g. of 1-phenyl-1-(α-picolyl)-hydrazine and 6.7 g. of 1-methyl-hexahydro-4H-azepin-4-one are dissolved in 60 ml. of dry ethanol. The solution is cooled in an ice bath and a stream of dry hydrogen chloride is bubbled through until saturation, whereupon the reaction is boiled under reflux for two hours. After cooling, the ammonium chloride formed is filtered off and the filtrate is concentrated in vacuo to 20 ml. The residue is dissolved in 100 ml. of water, rendered alkaline with concentrated ammonia and extracted three times with 50 ml. of ether. The combined ether extracts are dried over sodium sulphate, the ether is evaporated and the remaining oil distilled under high vacuum. The fraction passing over between 147° and 150° at 0.0004 torr as a yellow oil is collected. It is dissolved in 100 ml. of methanol while stirring and heating and to the stirred solution is then added slowly 50 ml. of a methanolic solution saturated at room temperature with picric acid, whereby 3-methyl-6-(α-picolyl)-2,3,4,5-tetrahydro - 1H - azepino[4,5-b]indole separates in the form of the crystalline picrate salt. It is filtered and recrystallised from acetone. Yield: 11.9 g. of picrate, M.P. 178–180°.

In order to transform the picrate into the hydrochloride salt, it is dissolved in a 1:1 acetone-methanol solution which is then charged onto an ion exchange column (Amberlite IRA 400 Cl⁻-form) and the column is eluted with methanol-acetone 1:1. The eluate is evaporated in vacuo to dryness, the residue solidifies to a solid foam which crystallises upon trituration with acetone. The hydrochloride of 3-methyl-6-(2-pyridylmethyl)-2,3,4,5-tetrahydro-1H-azepino[4,5-b]indole so obtained melts at 191–193°.

Example 16

27.5 g. of 1-benzyl-1-phenyl-hydrazine hydrochloride and 16.7 g. of hexahydro-4H-azepin-4-one ethylene ketal are dissolved in a mixture of 30 ml. of concentrated sulphuric acid and 500 ml. of water. The solution is boiled for 1 hour under reflux. Upon cooling, the product separates as the crystalline hydrogen sulphate salt. It is filtered and recrystallised from methanol. Yield: 30 g. of 6-benzyl-2,3,4,5-tetrahydro-1H-azepino[4,5-b]indole hydrogen sulphate, M.P. 268–270°. In order to obtain the hydrochloride salt, the hydrogen sulphate is suspended in 2 N sodium hydroxide solution and the free base is extracted with ether. The ether phase is separated, dried over sodium sulphate, filtered and then a saturated solution of hydrochloric acid in ether is added until complete precipitation of the hydrochloride salt occurs. This salt is filtered and recrystallised from a small amount of hot water. The 6-benzyl-2,3,4,5-tetrahydro-1H-azepino[4,5-b]indole hydrochloride so obtained melts at 243–45°.

Example 17

27.6 g. of 6-benzyl-2,3,4,5-tetrahydro - 1H - azepino[4,5-b]indole are dissolved in 500 ml. of methylethyl ketone, 27 g. of powdered potassium carbonate are added and, while stirring vigorously, 12.6 g. of dimethyl sulphate are added. The mixture is then boiled under reflux for 20 hours, filtered from the undissolved salts and the filtrate is evaporated to dryness in vacuo. The residue is distilled under high vacuum and the fraction passing between 163° and 172° at 0.02 torr is the desired 6-benzyl-3-methyl-2,3,4,5-tetrahydro - 1H - azepino[4,5-b]indole. It is transformed into the hydrochloride salt which melts at 201–202°.

Example 18

2.76 g. of 6-benzyl-2,3,4,5-tetrahydro - 1H - azepino[4,5-b]indole are dissolved in 2 ml. of 98% formic acid while cooling in an ice bath, and to the resulting solution is added 1 ml. of an aqueous 35% solution of formaldehyde. This solution is heated for 6 hours on a steam bath, then diluted with 50 ml. of water, rendered alkaline with ammonia and extracted with two 25 ml. portions of ether. The ethereal extracts are combined, then dried over sodium sulphate and evaporated to dryness. The residue is dissolved in 50 ml. of acetone and this acetonic solution is admixed, while stirring, with 5 ml. of an ether solution which has been saturated, while being cooled, with gaseous hydrogen chloride. After seeding the reaction solution, 6-benzyl-3-methyl-2,3,4,5-tetrahydro - 1H - azepino[4,5-b]indole-hydrochloride crystallizes out and is separated by filtration; 2.5 g. of this product having a melting point of 201–202° are obtained.

Example 19

1.65 g. of 6-benzyl-2,3,4,5-tetrahydro - 1H - azepino[4,5-b]indole are dissolved in 10 ml. of dioxan and the solution is admixed with 1 ml. of an aqueous 35% formaldehyde solution. The solution is shortly heated on a steam bath and then left to stand at room temperature (20–25°) for 30 minutes. The solution is then evaporated to dryness and the residue is dissolved in 20 ml. of methanol. 0.6 g. of sodium boron hydride are then slowly added to the methanolic solution while stirring. After further stirring at room temperature for 3 hours, the reaction mixture is diluted with 100 ml. of water and then extracted with two 25 ml. portions of ether. The combined ether extracts are dried over sodium sulphate and evaporated to dryness. The residue is dissolved in 30 ml. of acetone and from this solution about 1.3 g. of 6-benzyl-3-methyl-2,3,4,5-tetrahydro-1H-azepino[4,5-b]indole-hydrochloride (M.P. 201–202°) are obtained by either of the procedures described in Examples 11 and 18.

By repeating Example 19, but replacing the formaldehyde by an equivalent amount of acetaldehyde and otherwise following the same procedure, 6-benzyl-3-ethyl-2,3,4,5-tetrahydro-1H-azepino[4,5-b]indole is obtained.

I claim:

1. A therapeutic composition for the treatment of cough comprising an antitussively effective amount of a compound of the formula

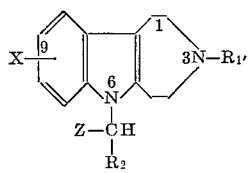

wherein:

X represents hydrogen, halogen of an atomic number up to 35 inclusive, lower alkyl or lower alkoxy, Z represents a phenyl radical which is substituted as defined under X, or a pyridyl radical, $R_{1'}$ represents lower alkyl, $R_2$ represents hydrogen or lower alkyl or a pharmaceutically acceptable addition salt thereof with an acid, and a pharmaceutically acceptable carrier.

2. A therapeutic composition according to claim 1 wherein said compound is one wherein $R_{1'}$ is methyl, $R_2$ is hydrogen, X is hydrogen and Z is phenyl.

3. A therapeutic composition according to claim 1 wherein said compound is one wherein $R_{1'}$ is ethyl, $R_2$ is hydrogen, X is hydrogen and Z is phenyl.

4. A therapeutic composition according to claim 1 wherein said compound is one wherein $R_{1'}$ is ethyl, $R_2$ is hydrogen, X is methyl in 9-position, and Z is phenyl.

5. A therapeutic composition according to claim 1 wherein said compound is one wherein $R_{1'}$ is methyl, $R_2$ is hydrogen, X is chlorine in 9-position, and Z is phenyl.

6. A therapeutic composition according to claim 1 wherein said compound is one wherein $R_{1'}$ is ethyl, $R_2$ is hydrogen, X is chlorine in 9-position, and Z is phenyl.

7. A therapeutic composition according to claim 1 wherein said compound is one wherein $R_{1'}$ is methyl, $R_2$ is hydrogen, X is hydrogen and Z is pyridyl-(2).

8. A therapeutic composition according to claim 1 wherein said compound is one wherein $R_{1'}$ is methyl, $R_2$ is hydrogen, X is hydrogen and Z is m-methoxyphenyl.

9. A method for treating cough comprising administering to a mammal requiring antitussive treatment an antitussively effective amount of a compound of the formula

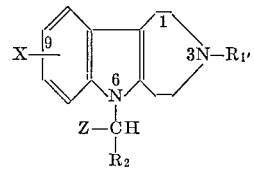

wherein:

X represents hydrogen, halogen of an atomic number up to 35 inclusive, lower alkyl or lower alkoxy, Z represents a phenyl radical which is substituted as defined under X, or a pyridyl radical, $R_{1'}$ represents lower alkyl, $R_2$ represents hydrogen or lower alkyl, or a pharmaceutically acceptable addition salt thereof with an acid.

10. A method according to claim 9 wherein said compound is administered orally in dosage unit form.

11. A method according to claim 10 wherein said compound is one wherein $R_{1'}$ is methyl, $R_2$ is hydrogen, X is hydrogen and Z is phenyl.

12. A method according to claim 10 wherein said compound is one wherein $R_{1'}$ is ethyl, $R_2$ is hydrogen, X is hydrogen and Z is phenyl.

13. A method according to claim 10 wherein said compound is one wherein $R_{1'}$ is ethyl, $R_2$ is hydrogen, X is methyl in 9-position, and Z is phenyl.

14. A method according to claim 10 wherein said compound is one wherein $R_{1'}$ is methyl, $R_2$ is hydrogen, X is chlorine in 9-position, and Z is phenyl.

15. A method according to claim 10 wherein said compound is one wherein $R_{1'}$ is ethyl, $R_2$ is hydrogen, X is chlorine in 9-position, and Z is phenyl.

16. A method according to claim 10 wherein said compound is one wherein $R_{1'}$ is methyl, $R_2$ is hydrogen, X is hydrogen and Z is pyridyl-(2).

17. A method according to claim 10 wherein said compound is one wherein $R_{1'}$ is methyl, $R_2$ is hydrogen, X is hydrogen and Z is m-methoxyphenyl.

References Cited

UNITED STATES PATENTS

| | | | |
|---|---|---|---|
| 2,786,059 | 3/1957 | Horlein | 260—296 |
| 3,419,569 | 12/1968 | Renner | 260—296 |

ALBERT T. MEYERS, Primary Examiner

J. D. GOLDBERG, Assistant Examiner

U.S. Cl. X.R.

424—244